Patented Feb. 19, 1935

1,991,787

UNITED STATES PATENT OFFICE 1,991,787

AMINIC ACIDS AND PROCESS OF PREPARING THEM

Paul Whittier Carleton, Pennsgrove, N. J., assignor to E. I. du Pont de Nemours & Company, Wilmington, Del., a corporation of Delaware No Drawing. Application April 14, 1931, Serial 530,137

32 Claims. (Cl. 260—124)

This invention relates to the treatment of mixtures of tertiary and secondary amines. More particularly it relates to the preparation of aminic acids and the separation of di-alkyl-aromatic amines from mono-alkyl-aromatic secondary amines.

This invention has for an object the preparation of organic chemical compounds and the separation of tertiary and secondary amines from their mixtures. A further object is to devise a satisfactory process for the separation of di-alkyl-aromatic amines from mixtures of the same with mono-alkyl-aromatic secondary amines. Other objects are the production of di-alkyl-aromatic amines in a very pure state, the preparation of mono-alkyl-aromatic secondary amines in a very pure state and in general an advance in the art. Other objects will appear hereinafter.

These objects are accomplished by treating a mixture of tertiary and secondary alkylated aromatic amines with the anhydride of an acyclic di-basic acid, containing not more than four carbon atoms, in an amount in excess of that required to molecularly combine with the secondary aromatic amine present to form an aminic acid, treating the reaction mass with dilute caustic alkali in an amount in excess of that molecularly required to convert the aminic acid to its alkali metal salt, thereafter separating the tertiary amine, hydrolyzing the aminic acid and thereafter separating the mono-alkylated aromatic amine and recovering the resultant acyclic acid. The alkali metal salt of the aminic acid may be isolated by evaporating the solution of the same after the tertiary amine has been separated.

The invention will be readily understood from a consideration of the following examples in which the parts are given by weight.

Example I

Two hundred (200) parts of an oil containing 20% mono-ethyl-aniline and 80% di-ethyl-aniline were treated with 18.6 parts of maleic anhydride for one hour with agitation. Thereafter 29.4 parts of a 31% solution of caustic soda and 100 parts of water were added. The agitation was continued for one-half hour and then the mixture filtered to break up emulsions. Following the filtering the upper layer consisting essentially of pure di-ethyl-aniline was separated. The aqueous layer was then hydrolyzed by adding an excess of concentrated sulphuric acid and boiling for three-fourths of an hour. This solution was then cooled and the fumaric acid filtered off. From the filtrate mono-ethyl-aniline was separated after adding an excess of a caustic alkali.

Example II

The procedure outlined in Example I was carried out with the substitution of succinic anhydride for the maleic anhydride. As a result of this procedure di-ethyl-aniline having a purity in excess of 99% was obtained.

The aminic acid produced by the addition of the sulphuric acid to the alkali metal salt of the aminic acid in the above examples may be isolated from the aqueous portion of the mixture by decantation, filtration or the like in case it is not desired to hydrolyze the same (by boiling) preparatory to recovering the mono-alkyl amine.

This invention is not limited to the separation of the specific compounds given in the above examples but may be applied to the separation of mixtures of mono and di-alkylated aromatic amines in general. It is especially applicable to the separation of methyl anilines, ethyl anilines, butyl anilines, and alkylated toluidines (ortho-meta- and para-), to the separation of methyl-ethyl aniline, methyl-benzyl aniline, ethyl-benzyl aniline and the like from mixtures containing secondary aromatic amines. This process is also applicable to the separation of a secondary amine from its admixture with a plurality of tertiary amines, and to the separation of a tertiary amine from its admixture with a plurality of secondary amines.

While this invention is susceptible to wide variations in procedure, the preferred results have been obtained when;

1.—The temperature during the treatment of the mixture with the acid anhydride does not arise above 65° C.

2.—The time of treatment of the mixture does not exceed two hours

3.—An excess of the acid anhydride is present from the start of the reaction

4.—There is an excess of caustic alkali present from the start in the treatment with water (of the product resulting from agitation with the acid anhydride) and 5.—The amount of the mono-ethyl aniline is not greater than 60% in a mixture of it and di-ethyl aniline.

In the treatment of certain mixtures with the acid anhydride it may be advisable to warm the reaction mass because of the consistency of the product. It has been found that better separations are obtained if the total amount of acid anhydride to be used and the amine mixture are reacted fairly rapidly. Ordinarily after the condensation with the acid anhydride a dilute solution of sodium hydroxide is added to the reaction mass until the solution is alkaline to brilliant paper yellow (C. I. 364) test paper. Small amounts of primary aromatic amines or other impurities may be present without detriment to the process but when the amount of primary aromatic amine exceeds 5% (preferably not more than 3% is allowed) the quality of the recovered di-alkyl aromatic amine is likely to be impaired.

Where the term "acyclic" is used it is intended that it have its usual meaning, that is, that it cover carbon compounds having an open chain, for example, paraffins, olefines and the like.

The acyclic aminic acids, for example ethylphenyl-maleaminic acid and ethylphenyl-succinaminic acid, may be produced by reacting the anhydride with the corresponding secondary alkyl amines as pointed out above. The purity of the resultant acids will, of course, depend upon the purity of the amine and the anhydride used in the reaction. Where the aminic acid has been prepared in the presence of a substantial amount of a tertiary amine, it may be purified as described above by converting it to its sodium salt which is water soluble, thereby differing from the tertiary amine which is oily. The aminic acid may be recovered from this separated solution of its sodium salt by acidifying the same.

This invention eliminates the use of the long and tedious methods of purification that have been previously used for the separation of di-alkyl aromatic amines from mixtures with other aromatic amines and in addition gives products of much higher purity than known processes. Another important advantage of this process lies in the practically quantitative reaction employed resulting in the minimization of losses of the oils.

As many apparently widely different embodiments of this invention may be made without departing from the spirit and scope thereof, it is to be understood that I do not limit myself to the specific embodiments thereof except as defined in the appended claims.

I claim:

1. The process which comprises treating a mixture of mono and di-ethyl-anilines not containing more than 60% mono-ethyl-aniline with maleic anhydride in an amount in excess of that required to molecularly combine with the mono-ethyl-aniline present to form ethyl-phenyl-maleaminic acid, for a period less than two hours and while maintaining a temperature below 65° C.

2. The process which comprises treating a mixture of mono and di-ethyl-anilines not containing more than 60% mono-ethyl-anline with succinic anhydride in an amount in excess of that required to molecularly combine with the mono-ethyl-aniline present to form ethyl-phenyl-succinaminic acid, for a period less than two hours and while maintaining a temperature below 65° C.

3. The process which comprises treating a mixture of mono and di-ethyl-anilines not containing more than 60% mono-ethyl-aniline with the anhydride of an acyclic di-basic acid containing not more than four carbon atoms in an amount in excess of that required to molecularly combine with the mono-ethyl-aniline present to form an ethyl-phenyl-aminic acid, for a period less than two hours and while maintaining a temperature below 65° C.

4. The process which comprises treating a mixture of mono and di-ethyl-anilines not containing more than 60% mono-ethyl-aniline with the anhydride of an acyclic di-basic acid containing not more than four carbon atoms in an amount in excess of that required to molecularly combine with the mono-ethyl-aniline present to form an ethyl-phenyl-aminic acid, for a period less than two hours while maintaining a temperature below 65° C., and adding an amount of dilute caustic alkali in excess of that required to form the alkali metal salt of the aminic acid.

5. The process which comprises treating a mixture of mono and di-ethyl-anilines not containing more than 60% mono-ethyl-aniline with the anhydride of an acyclic di-basic acid containing not more than four carbon atoms in an amount in excess of that required to molecularly combine with the mono-ethyl-aniline present to form an ethyl-phenyl-aminic acid, for a period less than two hours while maintaining a temperature below 65° C., adding an amount of dilute caustic alkali in excess of that required to form the alkali metal salt of the aminic acid and separating the di-ethyl-aniline.

6. The process which comprises treating a mixture of mono and di-ethyl-anilines not containing more than 60% mono-ethyl-aniline with the anhydride of an acyclic di-basic acid containing not more than four carbon atoms in an amount in excess of that required to molecularly combine with the mono-ethyl-aniline present to form an ethyl-phenyl-aminic acid, for a period less than two hours while maintaining a temperature below 65° C., adding an amount of dilute caustic alkali in excess of that required to form the alkali metal salt of the aminic acid, separating the di-ethyl-aniline, and hydrolyzing the aminic acid.

7. The process which comprises treating a mixture of mono and di-ethyl-anilines not containing more than 60% mono-ethyl-aniline with the anhydride of an acyclic di-basic acid containing not more than four carbon atoms in an amount in excess of that required to molecularly combine with the mono-ethyl-aniline present to form an ethyl-phenyl-aminic acid, for a period less than two hours while maintaining a temperature below 65° C., adding an amount of dilute caustic alkali in excess of that required to form the alkali metal salt of the aminic acid, separating the di-ethyl-aniline, hydrolyzing the aminic acid and separating the mono-ethyl-aniline.

8. The process which comprises treating a mixture of secondary and tertiary amines not containing more than 60% of the secondary amine, with the anhydride of an acyclic di-basic acid containing not more than four carbon atoms.

9. The process which comprises treating a mixture of secondary and tertiary amines with the anhydride of an acyclic di-basic acid containing not more than four carbon atoms while maintaining a temperature below 65° C. and separating the tertiary amine.

10. The process which comprises treating a mixture of secondary and tertiary amines with maleic anhydride.

11. The process which comprises treating a mixture of secondary and tertiary amines with succinic anhydride while maintaining a temperature below 65° C.

12. The process which comprises treating a mixture of secondary and tertiary amines with maleic anhydride and separating the tertiary amine.

13. The process which comprises treating a mixture of secondary and tertiary amines not containing more than 60% of the secondary amine, with succinic anhydride and separating the tertiary amine.

14. The process which comprises treating a mixture of water insoluble tertiary di-alkyl and secondary mono-alkyl amines not containing more than 60% of the secondary amine, with the anhydride of an acyclic di-basic acid containing not more than four carbon atoms.

15. The process which comprises treating a mixture of water insoluble tertiary di-alkyl and secondary mono-alkyl amines with the anhydride of an acyclic di-basic acid containing not more than four carbon atoms while maintaining a temperature below 65° C. and separating the tertiary amine.

16. The process which comprises treating a mixture of water insoluble tertiary di-alkyl and secondary mono-alkyl amines with maleic anhydride.

17. The process which comprises treating a mixture of water insoluble tertiary di-alkyl and secondary mono-alkyl amines with succinic anhydride while maintaining a temperature below 65° C.

18. Ethyl-phenyl-maleaminic acid.

19. Ethyl-phenyl-succinaminic acid.

20. An alkali metal salt of an ethyl-phenyl-aminic acid of an acyclic compound corresponding to an acyclic di-basic acid having not less than four carbon atoms.

21. The process which comprises treating a mixture of di-alkyl and mono-alkyl aromatic amines with the anhydride of an acyclic di-basic acid containing not more than four carbon atoms while maintaining a temperature below 65° C.

22. The process which comprises treating a mixture of di-alkyl and mono-alkyl aromatic amines not containing more than 60% of the secondary amine, with the anhydride of an acyclic di-basic acid containing not more than four carbon atoms and separating the tertiary amine.

23. The process which comprises treating a mixture of di-alkyl and mono-alkyl aromatic amines with maleic anhydride.

24. The process which comprises treating a mixture of di-alkyl and mono-alkyl aromatic amines not containing more than 60% of the secondary amine, with succinic anhydride.

25. An alkali metal salt of ethyl-phenyl-maleaminic acid.

26. A chemical compound having the formula:

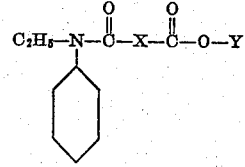

in which X represents

—CH₂—CH₂— or

—CH=CH— and Y represents H or an alkali metal radical.

27. A process for separating mono- and di-alkylated aromatic amines consisting in adding maleic anhydride to the mixture to convert the mono-alkylated amine into the corresponding maleaminic acid and separating the latter from the di-alkylated amine by agitating with an aqueous solution of alkali.

28. A process of separating mono-alkyl and di-alkyl anilines from a mixture thereof which comprises reacting the mono-alkyl aniline with maleic anhydride at a temperature below 65° C. in the absence of other materials and separating the unreacted di-alkyl aniline from the reaction mixture.

29. The process of separating N-mono-alkyl-aryl-amines of the benzene series, and N,N-dialkyl-aryl-amines of the benzene series from each other, which comprises reacting a mixture thereof with maleic anhydride, neutralizing with an aqueous alkali solution, and separating the two liquid layers thus formed from each other.

30. The process of separating an N,N-dialkyl-aryl-amine of the benzene series from an N-mono-alkyl-aryl-amine of the benzene series mixed therewith, which comprises treating said mixture with a quantity of maleic anhydride sufficient to react with all the N-mono-alkyl-aryl-amine present in the mixture, neutralizing the reaction mass with an aqueous alkali solution, and separating the non-aqueous layer formed from the aqueous layer.

31. The process of separating an N,N-dialkyl-aniline compound from a mixture thereof with incompletely N-alkylated aniline, which comprises treating the mixture with a quantity of maleic anhydride sufficient to react with all the incompletely N-alkylated anilines present, neutralizing the reaction mass with an aqueous alkali solution, allowing the mixture to settle into layers, and removing the resulting oily layer from the aqueous layer.

32. The process of separating N-mono-alkyl-anilines and N,N-diakyl-anilines from each other, which comprises reacting a mixture thereof with maleic anhydride, neutralizing the reaction mass with an aqueous alkali solution and separating the two liquid layers thus formed from each other.

PAUL W. CARLETON.